E. W. GRAEF.
COMBINED INTAKE AND EXHAUST MANIFOLD.
APPLICATION FILED JULY 12, 1917.
1,428,841.
Patented Sept. 12, 1922.
3 SHEETS—SHEET 3.
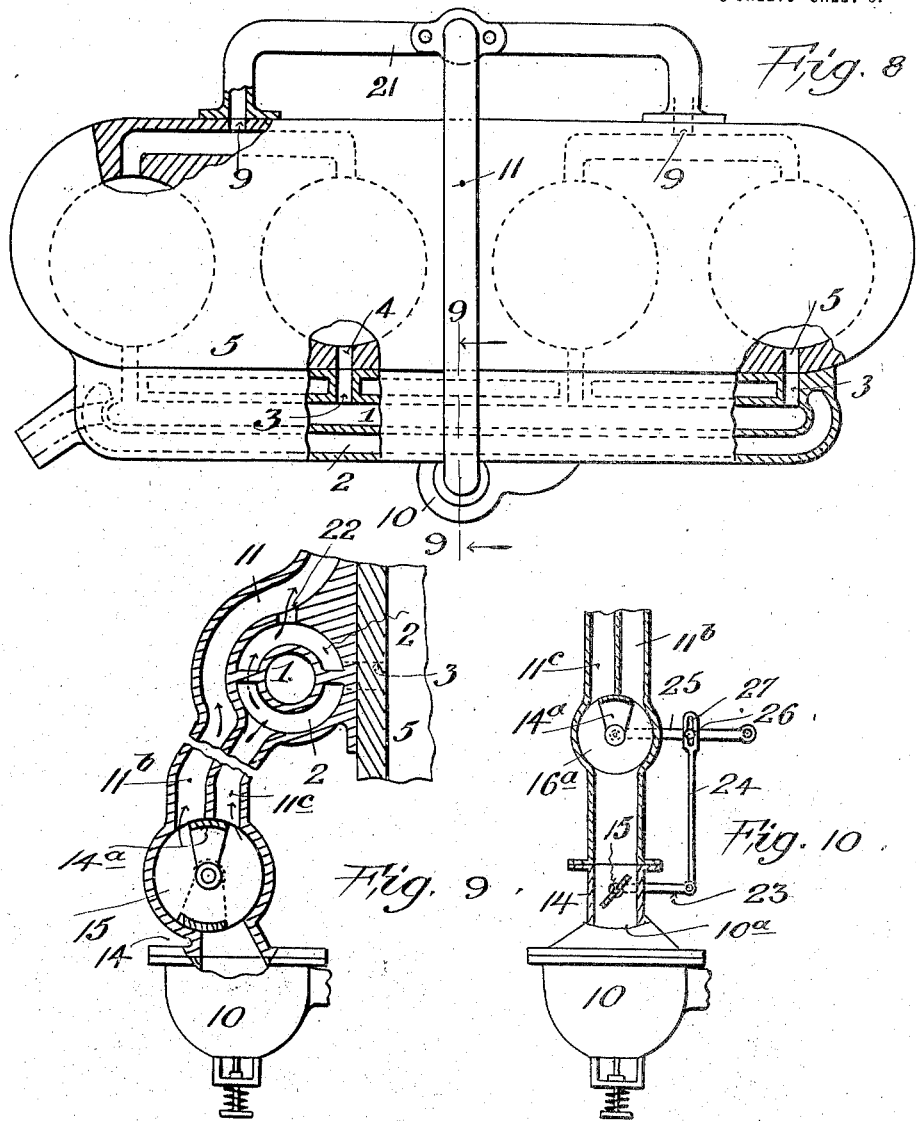

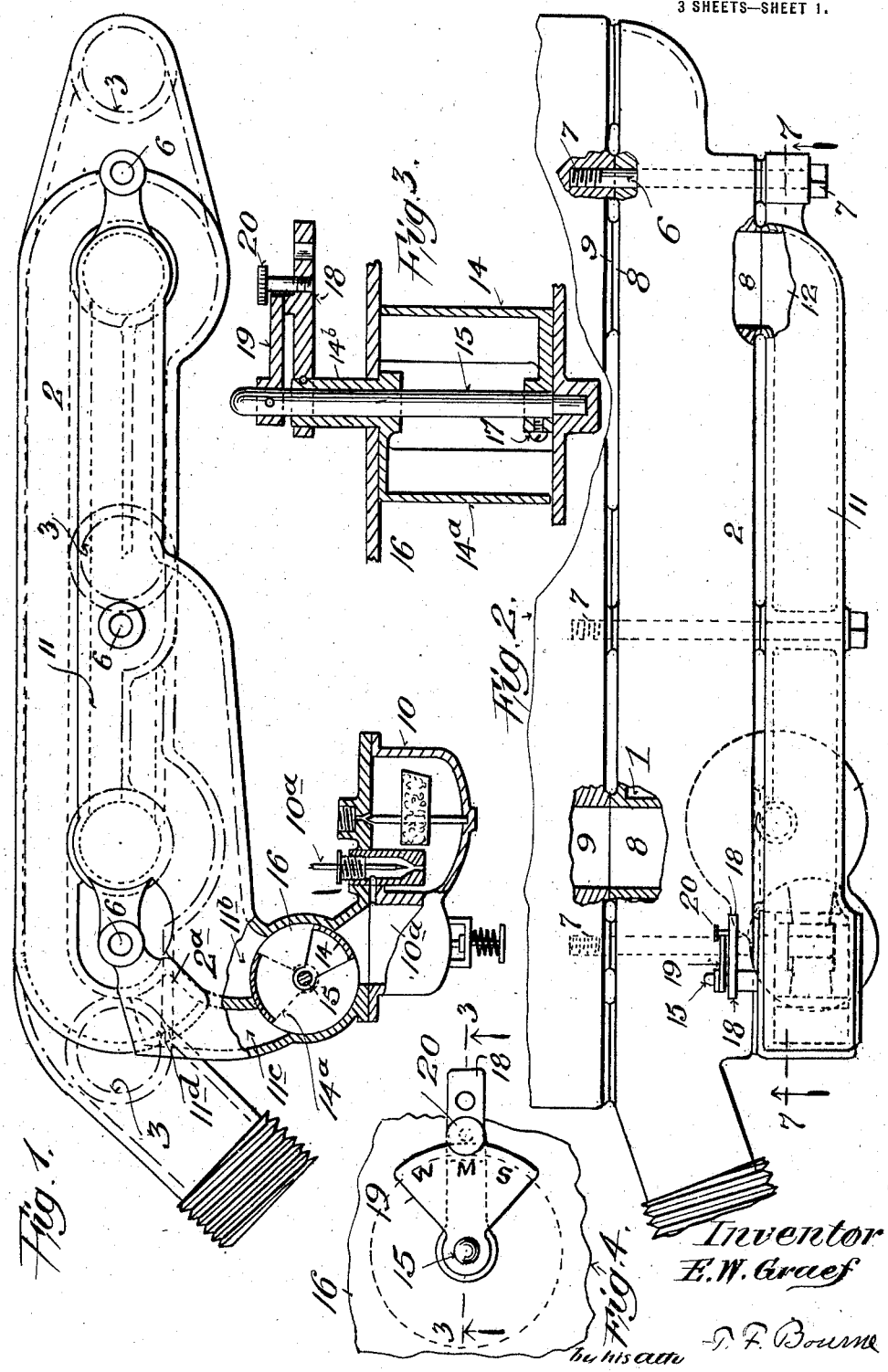

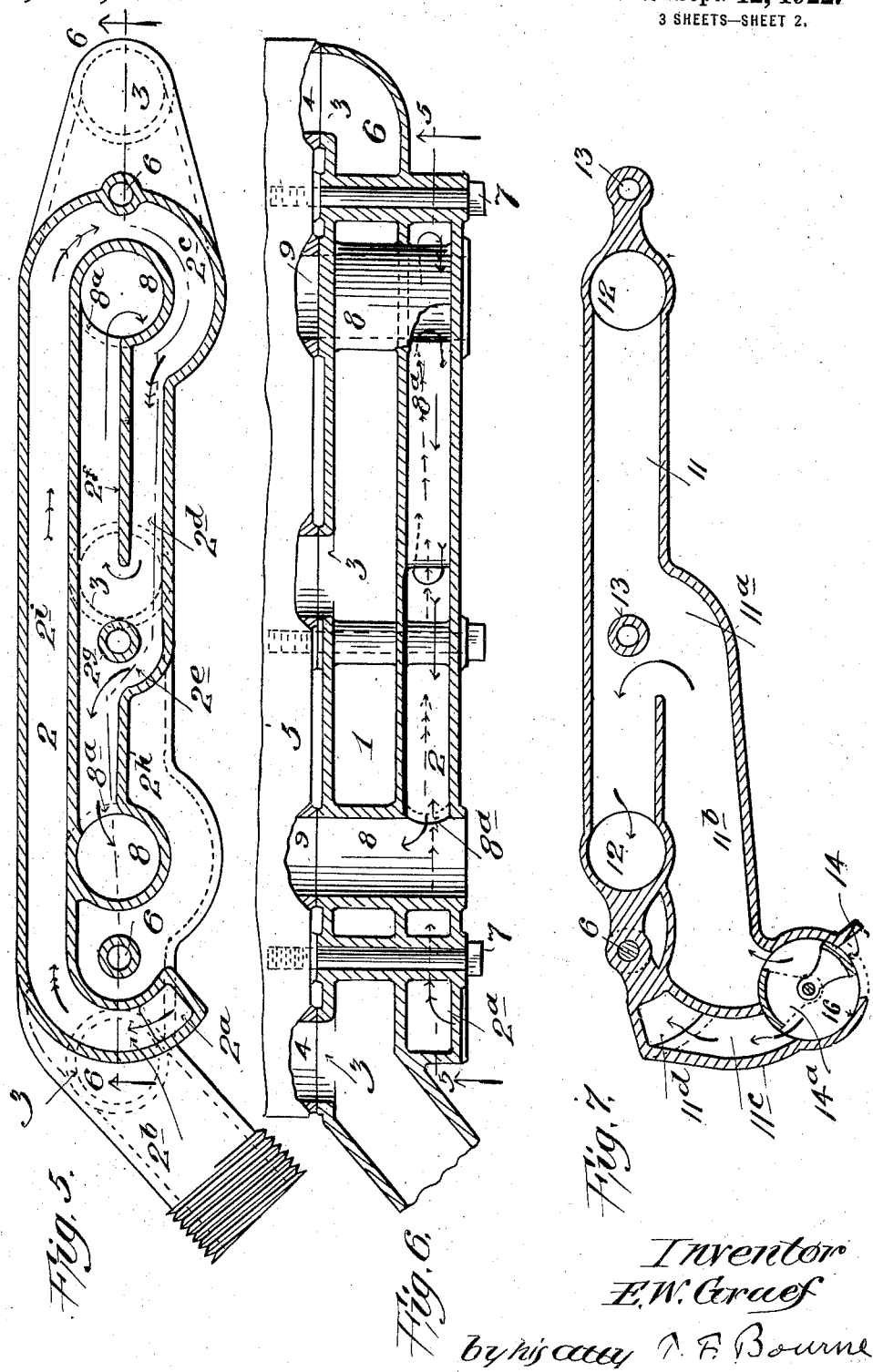

Patented Sept. 12, 1922.

1,428,841

UNITED STATES PATENT OFFICE.

ERNEST W. GRAEF, OF CALDWELL, NEW JERSEY, ASSIGNOR TO HENRY J. GAISMAN, OF WOODMERE, NEW YORK.

COMBINED INTAKE AND EXHAUST MANIFOLD.

Application filed July 12, 1917. Serial No. 180,223.

*To all whom it may concern:*

Be it known that I, ERNEST W. GRAEF, a citizen of the United States, and resident of Caldwell, in the county of Essex and State of New Jersey, have invented certain new and useful Improvements in Combined Intake and Exhaust Manifolds, of which the following is a specification.

Combustible mixtures for internal combustion engines are sometimes heated during their flow to the engine, and I find that it is desirable to be able to vary the temperature of such mixture according to weather conditions and according to the starting or running speed of the engine, whereby the mixture may be delivered to the engine in a more or less heated or cold condition according to the work required.

In my application Serial No. 157,284, filed March 24, 1917, I have disclosed an internal combustion engine equipped with a passage for fuel mixture, and means to heat the mixture flowing from the carbureter through said passage to the engine, in conjunction with another passage adapted to permit colder mixture to flow to the engine, and with means to cause commingling of the hotter and colder mixtures according to temperature conditions and requirements of the engine. My present improvements pertain generally to the control of the temperature of the mixture flowing to the engine not only according to weather conditions but also according to the extent of throttle opening at a given time, whereby the engine may be supplied with heated or hot mixture, as for starting or idling, or with cold mixture, as for high speed running, or, in other words, with hot mixture up to a given throttle opening, and then with commingled hot and cold mixtures, or with cold mixtures only, or nearly so, during further throttle opening, whereby the temperature of the mixture may be regulated or controlled according to conditions of work required, or atmospheric temperature, or both, at any given time.

My invention further comprises novel details of improvement and combinations of parts that will be more fully hereinafter set forth and then pointed out in the claims.

Reference is to be had to the accompanying drawings forming part hereof, wherein, Fig. 1 is a partly sectional side elevation illustrating my improvements adapted for connection with an internal combustion engine; Fig. 2 is a partly broken plan view of Fig. 1; Fig. 3 is an enlarged detail sectional view through the throttle shown in Fig. 1; Fig. 4 is a plan view of Fig. 3; Fig. 5 is a vertical section substantially on the line 5, 5, in Fig. 6; Fig. 6 is a horizontal section substantially on the line 6, 6, in Fig. 5; Fig. 7 is a section substantially on the line 7, 7, in Fig. 2; Fig. 8 is a partly sectional plan view illustrating a modification; Fig. 9 is a section substantially on the line 9, 9, in Fig. 8, and Fig. 10 is a sectional detail illustrating a modification.

Similar numerals of reference indicate corresponding parts in the several views.

A passage for exhaust gases is indicated at 1 and a passage for fuel mixture to be heated is indicated at 2. Said passages are shown in thermal relation and as cast in a single piece of material in the nature of a manifold, although they may be in separate parts secured together. The passage 1 communicates through ports 3 with exhaust ports 4 of an internal combustion engine 5. Cored openings 6 in the casting permit the same to be secured to the engine by means of bolts or screws 7. The passage 2 is shown provided with an inlet port $2^a$ for mixture, (Figs. 5 and 6). Extending transversely through passages 1 and 2 are passages 8 that communicate with the inlet ports 9 of the engine that communicate with the cylinders in any well known manner. Passages 8 do not communicate with exhaust passage 1 but receive heat from the hot exhaust gases therein. The passages 8 communicate with the passage 2 through ports $8^a$ (Figs. 5 and 6). The passage 2 is shown extending lengthwise within its casing at the upper part and curved at the mixture receiving end $2^b$ and also curved at the opposite end $2^c$, whence the mixture flows through the part $2^d$ of said passage below a partition or wall $2^f$ to and through an open portion $2^e$ to the portion $2^g$ that is between the partitions or walls $2^f$, $2^h$, $2^i$ (Fig. 5). The passage portion $2^g$ communicates at opposite ends with the ports $8^a$ of the respective passages 8. By the arrangement described a relatively long course for the mixture is provided in thermal relation to the exhaust passage 1. Any suitable carbureter, indicated at 10, may be provided for production of the mixture which may flow therefrom to passage 2 to be heated therein in its passage to the engine through the ports 8ª and passages 8. A second passage for mixture is indicated at 11, shown in Figs. 1 and 2 applied upon the exterior of the manifold or casing containing passages 1 and 2. The passage 11 may be comprised in a suitable casting, which is shown provided with ports 12 adapted to register with the passages 8 for supplying mixture directly from the carbureter to the engine without passing through passage 2 when it is desired to supply a cold or cool mixture for the engine. The passage 11 may be provided with cored holes 13 receiving screws 7 for securing passage 11 against passage 2 with the ports 12 and passages 8 in communication, (Fig. 2). The casting containing passage 11 is shown provided with an opening 11ª (Fig. 7) providing communication between passage 11 and a duct 11ᵇ between ports 12 for the flow of mixture more or less evenly to said ports from the carbureter. Said casting also is shown provided with a duct 11ᶜ that communicates with port 11ᵈ which is adapted to register or communicate with port 2ª of passage 2 for the delivery of mixture to the latter passage from the carbureter.

It will be observed that while the passages 8 are not shown of any great extent, yet, since the mixture from passage 11 is not intended to absorb as much heat as the mixture in passage 2, some heat may be imparted to the mixture flowing in passages 8, since they are shown in thermal relation to the exhaust gases in passage 1, and since the passage 11 may absorb some heat from radiation or conduction by reason of its relation to passage 2, yet as passage 11 is shown outside of passage 2 heat imparted to the mixture in passage 11 will be less than the heat imparted to mixture in passage 2, for which reason I may term the mixture flowing through passage 11 the "cold" mixture. It will be understood that passage 11 may be supported at any suitable distance from passage 2, so that the mixture flowing in passage 11 may have little, if any, heat imparted thereto. When mixture flows to the engine through both passages 2 and 11 the heated and the colder portions of the mixture will commingle in passages 8.

The carbureter may be of any ordinary or desired variety or may be equipped with thermostatic means for controlling the operation of the needle valve, such as set forth in United States Letters Patent issued to H. J. Gaisman, on June 19, 1917, No. 1,230,147.

A feature of my invention comprises means to direct mixture from the carbureter to flow through the heated passage 2 to the engine, also to flow through passage 11 to the engine separate from the flow of the mixture through passage 2, and to direct the flow of the mixture through both of said passages simultaneously according to required conditions and according to the extent of throttle opening between the carbureter and the engine, said means comprising adjustable parts adapted to be set to vary or regulate the flow of the mixture through said passages as required for different throttle openings. A throttle valve is indicated at 14 secured to a shaft 15 and journaled in a housing 16, which housing communicates at one end with the carbureter mixture chamber 10ª and also with the ducts 11ᶜ and 11ᵇ. The throttle 14 controls the flow of mixture from the carbureter and a supplemental adjustable throttle member 14ª controls the flow of mixture to the passages 2 and 11, as through the ducts 11ᶜ, 11ᵇ. The throttle member 14 is shown secured to shaft 15 by a screw 17 (Fig. 2) and the throttle member 14ª is shown provided with a hub 14ᵇ adjustable on shaft 15 and provided with an extension 18 which may be connected with any suitable operating device adjacent to the operator for controlling the throttle. Means are provided for securing the throttle members 14, 14ª in set position with relation to one another, for which purpose I have shown shaft 15 provided with a sector-like projection 19 adapted to be held in set position with relation to projection 18 by means of a screw 20 threaded in projection 18 adapted to bear firmly upon projection 19, whereby the throttle members 14, 14ª may be rotated together. The throttle member 14ª may be set with relation to member 14 so as to vary the flow of mixture to the passages 2 and 11 with respect to the opening of throttle member 14.

While in the construction illustrated in Figs. 1 to 7 the intake ports of the engine for the mixture are on the same side of the engine as the exhaust ports, it will be understood that my improvements are adapted to be used in engines wherein exhaust ports and intake ports are on opposite sides thereof, as illustrated in Figs. 8, 9 and 10, wherein the main construction is substantially similar to that set forth in my aforesaid application Serial No. 157,284. The duct 11ᵇ communicates through passage 11 with a manifold 21 that communicates with intake ports 9, the passage 11 being quite extended to aid in reducing the temperature of hot flowing mixture, and the duct 11ᶜ communicates with passage 2 in thermal relation to the exhaust passage 1, the passage 2 having one or more ports 22 communicating with passage 11 (Figs. 8 and 9). The throttle of Figs. 8 and 9 is of the character set forth with regard to Figs. 1 to 7 to vary the flow of mixture to passages 2 and 11 with respect to the opening of throttle member 14. In the form illustrated in Fig. 10 the ordinary type of butter-fly throttle valve is illustrated at 14 and the projection 23 from shaft 15 is connected by a link 24 with a projection 25 from the throttle member 14ª of the housing 16ª. Relative adjustment between the throttle members 14, 14ª may be made by means of a bolt 26 and slot 27 of link 24. Either of the projections 23 or 25 may be operated for controlling the throttles in a wellknown manner.

In accordance with my improvements throttle members 14ª, 14 may be proportioned and set one with relation to another to be operated together, according to weather or running conditions so that, for instance, if the weather be cold the main part or all of the mixture may be directed through duct 11ᶜ thence through heated passage 2 to the engine intake port for substantially all throttle openings, or partly through passage 2 for wide throttle opening or nearly so for high speed. If the weather be hot the throttle members may be set so that the mixture will flow through the heated passage 2 or a small portion of the throttle opening, as for idling and low speed, and for further throttle opening the throttle member 14ª will gradually close off the flow of mixture through the passage 2 and will correspondingly open the flow of mixture through passage 11 direct to the engine for its higher speed, so as not to be heated by hot exhaust gases to much, if any, extent. If the weather be mild the throttle members 14, 14ª may be so set relatively to one another that the main part or all of the mixture up to moderate engine speed may be caused to flow through heated passage 2, and for higher speed of the engine a relatively small amount of the mixture may flow through passage 2 while a greater amount of the colder mixture may flow through passage 11, the two portions of mixture commingling for use. Variation of the proportion of heated and colder mixture flowing to the engine may be made by setting throttle member 14ª relatively to member 14 as occasion may dictate. One of the advantages of my improvements is that notwithstanding that passage 2 is in thermal relation to exhaust passage 1, whereby the mixture flowing through passage 2 may be heated by the exhaust gases in passage 1, I am enabled to utilize preheated mixture in the engine for slow running where the heat of compression pressure of the gases is not so great, and yet when the engine speeds up, and the temperature of the gases in the cylinders increases by reason of higher compression pressure, I am enabled then to supply a cooler mixture by causing the mixture to flow from the carburetor more or less direct to the engine cylinders through passage 11 so that the compressed mixture in the cylinders will not have too high a temperature thereby to avoid pre-ignition or "knock" in the engine. I am thus enabled to control the temperature of the mixture flowing to the engine according to the variation of throttle opening with respect to a set or adjusted relation of the throttle members and I am enabled to adjust such relation of the throttle members when desired, or at will, according to atmospheric conditions, whereby to attain the most favorable temperature conditions of the mixture according to the engine requirements.

A further advantage of my improvements is that a carbureter or carbureters may be connected with the passages 2 and 11 for supplying a light hydrocarbon fuel, such as gasoline, and heavier hydrocarbon fuel, such as kerosene, whereby the engine may be started and heated up with the use of gasoline and then may be run by the use of kerosene without the gasoline, or with a mixture of both, it being understood that at low throttle opening the mixture containing kerosene oil may be heated in its flow to the engine, the preheating of the kerosene and air mixture permitting the engine to operate properly at slow engine speeds, and the temperature of the mixture may be regulated as described, for varying speeds.

While I have illustrated and described particular forms of manifolds containing the several passages for the mixture and exhaust gases, and particular forms of throttles adapted to control the flow of mixture from the carbureter and the flow of the mixture through one or another, or both, of the mixture passages, it will be understood that my invention is not limited to the details of construction and relative arrangements of parts set forth, as the same may be varied, for accomplishing the purposes of my invention without departing from the spirit of the appended claims.

I have illustrated and described my improvements as adapted to an engine having a plurality of cylinders yet the arrangements may be adapted for an engine having a single cylinder without departing from the spirit of my invention.

Having now described my invention what I claim is:

1. The combination of an internal combustion engine, with a carburetor, means providing a plurality of passages for mixture between the carburetor and the engine intake port or ports, means to heat mixture flowing to the engine through one of said passages, the other passage permitting cold mixture to pass to the engine, and throttle means to close and open said passages between the engine and the carbureter to control the flow from the carbureter to the engine adapted to deliver to the engine through said passages mixture of varying volume and temperature according to the extent of throttle opening.

2. The combination of an internal combustion engine, with a carbureter, means providing a plurality of separate courses for mixture from the carbureter to the engine intake port or ports, means to heat mixture flowing to the engine through one of said courses, and throttle means to close and open said courses to control the flow of mixture from the carbureter to the engine adapted to direct heated mixture into the engine at one throttle opening and cooler mixture of greater volume into the engine at a different throttle opening.

3. The combination of an internal combustion engine, with a carbureter, means providing a plurality of separate sources for mixture from the carbureter to the engine intake port or ports, means to heat mixture flowing to the engine through one of said courses, and a throttle having relatively adjustable members operative together adapted to control the flow of mixture from the carbureter to either of said courses and simultaneously through both said courses to direct heated or cooler mixture to the engine according to the throttle opening.

4. The combination of an internal combustion engine, with casing means having a plurality of separate mixture intake passages therefor, throttle controlled means to open and close said passages successively to control the flow of mixture to said passages successively and arranged to decrease the flow to one passage whilst increasing the flow to the other passage, and the casing means having an engine exhaust passage in thermal relation to one of said mixture passages to permanently heat it and not the other mixture passage while the engine operates.

5. The combination of an internal combustion engine, with casing means having a plurality of mixture intake passages therefor, throttle controlled means to control the flow of mixture to said passages successively, and arranged to limit the flow of mixture to one passage and permit the flow of mixture to the other passage at low engine speed and to reduce the flow to the last named passage and permit more or less flow through the other passage during increased engine speed, and means to heat one of said passages.

6. The combination of casing means having a plurality of passages for fuel mixture, means to heat one of said passages, a throttle member to control the flow of mixture to both of said passages, and a supplemental throttle member co-operative with the first named throttle member to vary the flow of mixture through said passages according to throttle position.

7. The combination of casing means having a plurality of passages for fuel mixture, means to heat one of said passages, a throttle comprising a plurality of members adjustable with relation to one another and operative together to vary the flow of mixture to and through said passages according to the set relation of said members.

8. The combination of casing means having a plurality of passages for fuel mixture, means to heat one of said passages, a carbureter, a throttle member to control the flow of mixture from the carbureter, and a supplemental throttle member adjustable with relation to said first named member and operative therewith to control the flow of mixture through said passages according to the set relation of the throttle members with respect to one another and to said passages.

9. The combination of casing means having a passage for exhaust gases and a passage for fuel mixture in thermal relation thereto, the casing means having a passage communicating with the second named passage and adapted for connection with the intake port of an engine, a housing communicating with said second and third named passages, a carbureter communicating with the housing, and throttle means in the housing adapted to control the flow of fuel mixture from the carbureter to the housing and to control the flow of mixture from the housing separately into said last named passage and simultaneously into both of said passages according to throttle setting.

10. The combination of a casing containing a passage for exhaust gases, a passage for fuel mixture in thermal relation thereto and passages communicating with the mixture passage and adapted to communicate with intake ports of an engine, another casing having a fuel passage communicating with the third named passages, means to secure the second named casing adjacent to the second named passage, and means to direct fuel mixture separately into the fuel passages and simultaneously into both of said passages.

11. The combination of a casing containing a passage for exhaust gases, a passage for fuel mixture in thermal relation thereto and passages communicating with the mixture passage and adapted to communicate with intake ports of an engine, another casing having a fuel passage communicating with the third named passages, means to secure the second named casing adjacent to a housing communicating with said fuel passages, a carbureter communicating with said housing, and throttle means in the housing adapted to control the flow of fuel mixture from the carbureter to the housing and to control the flow of mixture from the housing separately into said first named fuel mixture passage and the passage of the second named casing and simultaneously into both of said passages according to throttle setting.

12. The combination of casing means having a plurality of fuel passages, means to heat one of the passages, a housing having communication with said passages, a carbureter communicating with said housing, a shaft, a plurality of throttle members mounted upon the shaft within the housing, one of said throttle members being adapted to control the flow to the housing from the carbureter and the other throttle member being operative with the first member to control the flow from the housing to said passages according to throttle setting.

13. The combination of casing means having a plurality of fuel passages, means to heat one of the passages, a housing having communication with said passages, a carbureter communicating with said housing, a shaft, a plurality of throttle members mounted upon the shaft within the housing to be operated conjointly by said shaft, means to adjust one of said throttle members relatively to the other within the housing, one of said throttle members being adapted to control the flow of mixture from the carbureter to the housing and the other member being adapted to control the flow of mixture from the housing to said fuel passages in accordance with the set relation of said members to one another.

14. The combination of casing means having a plurality of fuel passages, means to heat one of the passages, a housing having communication with said passages, a carbureter communicating with said housing, a shaft, a plurality of throttle members mounted upon the shaft within the housing to be operated conjointly by said shaft, one of said throttle members having a projection, said shaft having a projection, and means to secure said projections together in adjusted positions for varying the relation of the throttle members to one another, one of said throttle members being adapted to control the flow of mixture from the carbureter to the housing and the other throttle member being adapted to control the flow of mixture from the housing to said fuel passages in accordance with the relation of the throttle members to one another.

Signed at New York city in the county of New York and State of New York this 9th day of July A. D. 1917.

ERNEST W. GRAEF.

Witnesses:
MARIE F. WAINRIGHT,
CHAS. W. BENJAMIN.